July 23, 1957 H. GEHRE 2,800,021
MEASURING-WHEEL METERS
Filed April 10, 1952 2 Sheets-Sheet 1
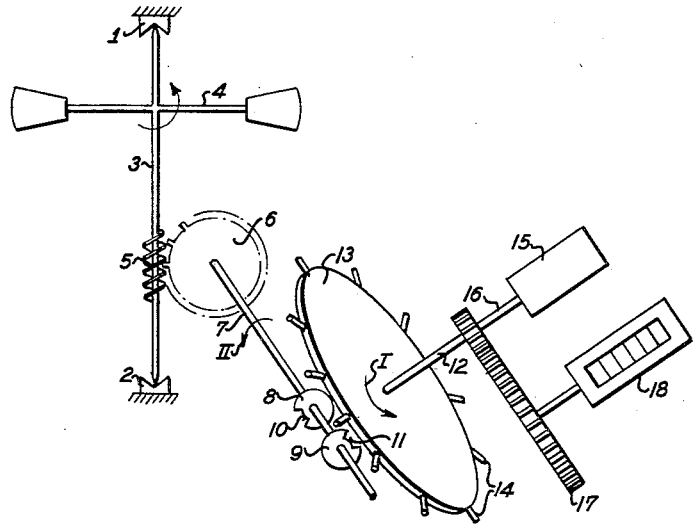
Fig. 1
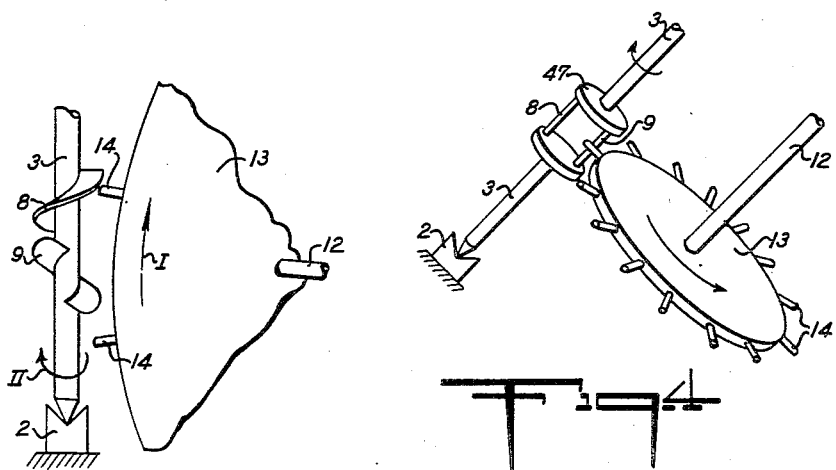
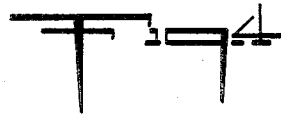
Fig. 2
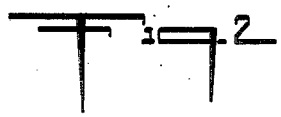
INVENTOR
HANS GEHRE
BY Burgess, Dinklage & Sprung
ATTORNEY

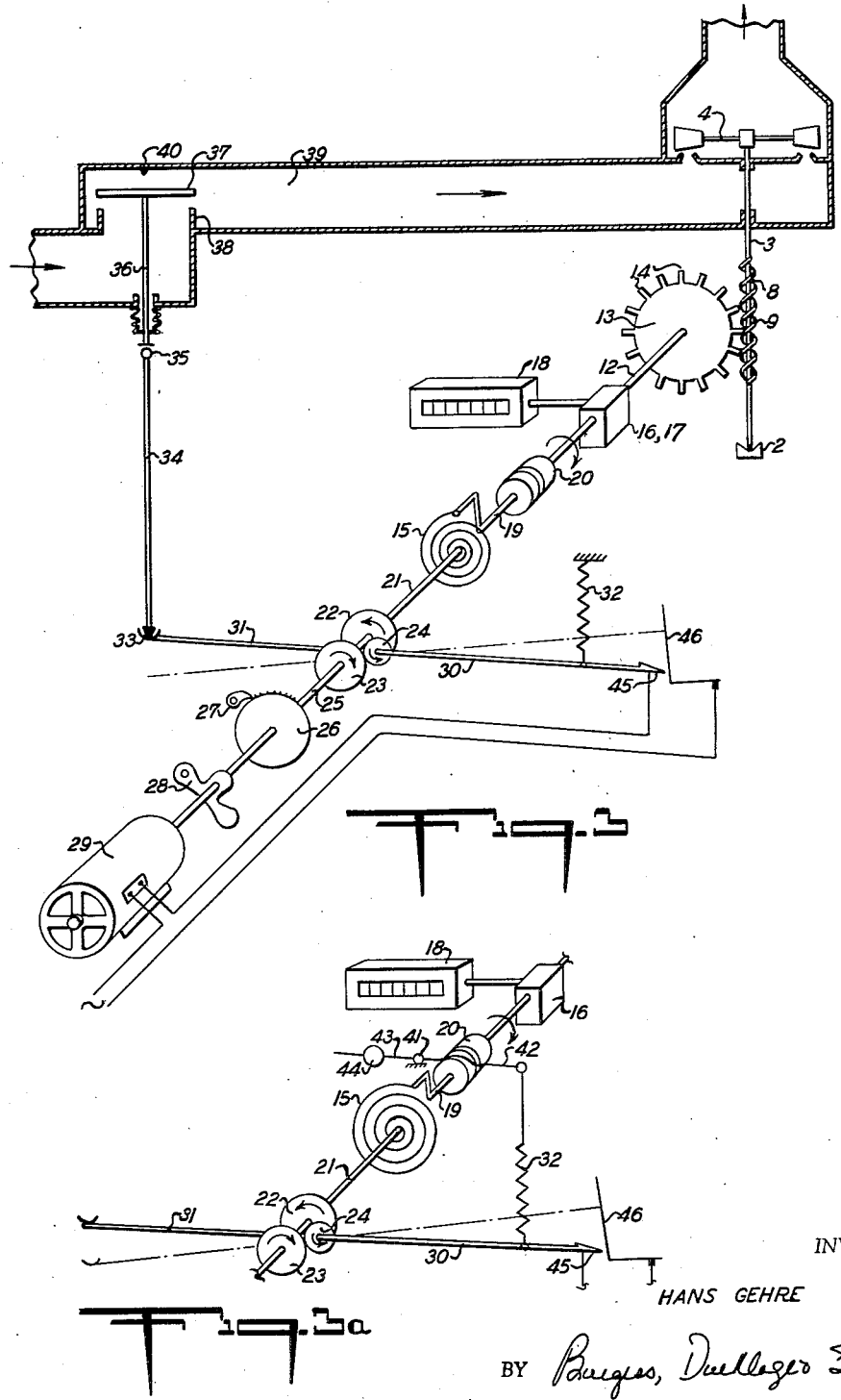

United States Patent Office 2,800,021
Patented July 23, 1957

2,800,021

MEASURING-WHEEL METERS

Hans Gehre, Oberkassel (Rhine), Germany

Application April 10, 1952, Serial No. 281,625

Claims priority, application Germany July 4, 1951

9 Claims. (Cl. 73—231)

This invention relates to improvements in measuring wheel meters. It more particularly relates to measuring wheel meters of the type used for determining the volume of liquids and gases flowing through pipe lines by measuring the flow velocity.

The term "measuring wheel meter" is specifically intended to include any type of meter in which the measuring wheel is imparted a rotary motion by the impinging force of a stream of a fluid (flow impulse). Such meters include impeller wheel meters, screw-type wheel meters, paddlewheel meters, Woltman-type meters and the like.

All prior known measuring wheel meters have the disadvantage that a certain amount of energy is required to overcome the resistances to the running of the measuring wheel. These resistances to running are caused by the bearing friction of the measuring wheel shaft itself and mainly by the friction, etc., of the parts connected thereto, such as the meter-counting mechanism and transmission therefor.

The energy necessary to overcome these resistances to running in all prior type meters has been supplied by the flow of the fluid being measured. Due to this the speed of rotation of the measuring wheel lags behind the theoretical value (which value would be obtained if these resistances were not present), and that as far until the slippage arising at the measuring wheel produces a driving moment sufficing to overcome the resistance moment produced by the running resistances. Thus, a certain amount of the rotary force or torque on the measuring wheel caused by the action of the impinging fluid is merely used to overcome these resistances to a rotation. This slippage, of course, will disturb the proportionality between the amount of flow and the speed of rotation of the measuring wheel, and cause an error in the indication. This error, of course, rapidly becomes greater with decreasing flow velocities. The error is particularly troublesome in connection with the measurement of gases, since the amount of flow energy of the gases necessary to overcome these resistances to running is very large in proportion to the total amount of energy available from the flow.

For this reason, the measuring range of these measuring wheel meters had a relatively high lower limit of measurement, and it was therefore not possible to use meters of this type for measuring small capacities, as would be highly desirable, because of their structural simplicity and correspondingly low cost.

Attempts were made to overcome this disadvantage and to improve the indications of such meters. These attempts consisted principally in influencing the flow in order to regulate the operation of the measuring wheel; adding a constant or variable correction to the indications of the counting mechanism; or by using a suitably variable transmission to the counting mechanism of the meter. These expedients, however, will only give coarse approximations which will no longer meet the increasingly exacting requirements of the measuring art.

None of these prior proposals attempt to remove the source of error itself, but merely attempt to compensate therefor. Thus, none of these prior-mentioned proposals attempt to eliminate the resistances to running of the measuring wheel or the necessity of consuming flow energy for overcoming these resistances. As long, however, as this source of error itself remains, the indications of this type of meter will always be dependent upon the density or specific gravity of the fluid being measured, inasmuch as the flow impulse acting on the measuring wheel to impart rotary motion thereto is determined in part by this specific gravity. In addition, this dependance of the prior known meters on the specific gravity of the fluid being measured offers serious constructional disadvantages and emphasizes the urgent need for a meter without this disadvantage in the art.

If the measuring wheel of the measuring-wheel meter would be free from any resistance to rotation, its speed of rotation would then be only determined cinematically, that is only by the corresponding fluid velocity and the velocity triangles resolved therefrom as the fluids impinge on the measuring wheel. Thus, a complete proportionality between the flow volume, as, for example, in cubic meters per hour, and the speed of rotation, as, for example, in revolutions per hour, of the measuring wheel would exist. The operation of the measuring-wheel meter would then be completely independent of the specific gravity of the fluid being measured. With this, a measuring-wheel meter would be produced which would achieve the same measuring precision as a perfect volume meter, but would not have the disadvantages of all the usual constructions of volume meters.

One object of this invention is a measuring-wheel meter in which all, or a major portion, of the resistances to rotation of the measuring wheel are eliminated.

A further object of this invention is a measuring-wheel meter in which the transmission between the measuring-wheel and the counting mechanism of the meter is developed in such a manner that no drive resistances are transmitted to the shaft of the measuring wheel by the counting mechanism or the transmission of the drive to such mechanism, and at the same time the resistances resulting from the supporting of the measuring-wheel shaft itself are compensated for. These, and still further objects will become apparent from the following description, read in conjunction with the drawings, in which:

Fig. 1 diagrammatically shows one embodiment of a measuring-wheel meter in accordance with the invention;

Fig. 2 diagrammatically shows a different embodiment of the escapement mechanism shown in Fig. 1;

Fig. 3 diagrammatically shows an embodiment of a complete measuring-wheel meter set-up in accordance with the invention with an automatic safety device in case of driving power failure;

Fig. 3a diagrammatically shows an embodiment similar to Fig. 3 with a different embodiment of an automatic safety device; and Fig. 4 diagrammatically shows a different embodiment of the escapement mechanism.

In accordance with the present invention the driving means for the counting mechanism of the meter and transmission to said counting mechanism comprises a separate driving device which offers an additional drive to the measuring wheel shaft and is formed as or driven by a separate source of energy and the speed of rotation of which device is controlled through governor means by the speed of rotation of the measuring wheel.

Any known means may be used as such separate driving means, as, for example, spring mechanisms, synchronous motors, fluid- or gas-pressure motors, etc. The governing means by which the speed of rotation of the measuring wheel controls the speed of rotation of said separate driving mechanism may be any known or conventional governing means. These governing means may control the speed of revolution of said separate driving mechanism by continuous speed governing or intermittent motion control. Thus, these governing means may consist of a ratchet type or escapement wheel seated on the drive shaft of the auxiliary drive means, and a control or locking mechanism for intermittently releasing the ratchet or escapement wheel for rotation.

The invention will be further explained and described with reference to the embodiments shown in the drawings. As shown in Fig. 1, the measuring wheel 4 in the form of a paddle wheel, is mounted on its shaft 3, which is supported by the two bearing means 1 and 2. The flowing fluid to be measured is caused to impinge on the paddles of the measuring wheel 4 and thus impart a rotary motion thereto. A worm 5 is seated on the shaft 3 and rotates with this shaft. A worm gear 6 is positioned in meshing contact with the worm 5, and as the shaft 3 will rotate, it will cause the worm gear 6 with its connected shaft 7 to also rotate. Two spaced-apart circular discs 8 and 9 are seated on this shaft 7. The disc 8 has a recess 10 and the disc 9 has a recess 11. The two discs are so arranged that their respective recesses 10 and 11 are 180° away from each other. A wheel 13, having projecting arms or pins 14, is arranged radially to the shaft 7 on a shaft 12. This type of wheel 13 will be referred to as an escapement wheel and is very similar in appearance and operation to the escapement wheel of a clock. The shaft 12, and thus the escapement wheel 13, is driven by a spring mechanism 15, for example, as represented in Fig. 3. The shaft 12, through a suitably selected transmission gear train 16, 17, drives the counting mechanism 18. The distance of the shaft 12 from the worm gear shaft 7 is so selected that the pins 14 of the escapement wheel 13 may pass through the recesses 10 and 11 of the two discs 8 and 9.

The drive means, shown as spring mechanism 15, and, of course, not limited thereto, transmits a rotary force to the escapement wheel 13 and tends to rotate it in the direction of the arrow I. The measuring wheel 4 drives the shaft 7 in the direction of arrow II. The pins 14 of the escapement wheel 13 will thus alternately strike the edges of discs 8 and 9 one after the other so that the escapement wheel 13 is prevented from continuously rotating.

As shown in Fig. 1, one of the pins 14 of the escapement wheel 13 has just engaged the edge of disc 9 so that the escapement wheel will be prevented from rotating any farther. With the rotation of the measuring wheel 4, however, the disc 9 will rotate, and after the recess 11 has moved below this pin, it will be released and the escapement wheel 13 will again rotate until the next pin comes in contact with the edge of disc 8, at which time the escapement wheel will again be held fast. Upon further rotation of the disc 8, the held pin will then slip through recess 10, and the escapement wheel will rotate until the pin just released through the recess 10 comes in contact with the edge of disc 9 and again stops the escapement wheel. This motion is continuously repeated.

As the pins 14 press against the edges of the discs 8 or 9, there is naturally a certain amount of friction and the shaft 7 and thus the shaft 3 and measuring wheel 4 will have a certain resistance to rotation. The transmission between the spring mechanism 15 and the escapement wheel 13, however, is so chosen that the friction or bearing pressure of the pins 14 on the edges of the discs 8 and 9 is insignificantly small. Due to this, and even with this friction, the resistance to movement of the shaft 7 is negligibly small. And due to this, it is possible to arrange in accordance with the invention the discs 8 and 9 directly on the measuring-wheel shaft 3 instead of on the separate shaft 7.

In accordance with this embodiment, as shown in Fig. 2, the discs 8 and 9, instead of being developed as flat discs, are formed helically. In this embodiment, the pitch of the helical surface can be made so large that the bearing pressure of the pins 14 against the helical surface will produce a torque in the direction of rotation of the measuring wheel, which is sufficient to compensate for all the resistances to rotation (bearing friction, etc.) of the measuring-wheel shaft. Naturally, depending on the requirements of the individual case, it is also possible to provide an under-compensation or over-compensation for this resistance.

In the latter case the amount of over-compensation can for example be so chosen, that moreover the inertia of the measuring wheel, which inertia usually appears with alterations of the rotation speed of the measuring wheel, will be respected with a certain mean value. And this value can be so chosen, that the error curve of the meter, when by a constant rate of flow the inertia at the measuring wheel shaft disappears, will not exceed the allowed tolerance.

Thus, in accordance with the present invention, a resistance-free measuring wheel is obtained, and the measuring precision and measuring range is increased to an extent heretofore deemed impossible.

In the arrangement, according to Fig. 2, the direction of rotation is so selected that the bearing pressure of pins 14 acts upward, i. e., against the weight of the rotating system. Naturally, the reverse arrangement is also possible. The helical surfaces 8 and 9 surround the measuring-wheel shaft 3 to such an extent that the intermittent release of pins 14 is assured. This action otherwise takes place in the manner set forth in Fig. 1.

The embodiments according to Figs. 1 and 2 do not give a constant rotary motion of the escapement wheel 13, but rather an intermittent rotary motion. When the measuring wheel shaft 3 or the worm gear shaft 7 is rotating slowly, this is of no importance. However, when rotating rapidly, the escapement wheel 13 requires a strong acceleration during the intermittent advances in order to be able to follow the speed of rotation of the measuring wheel shaft and thus the tempo of the stop-go action. This, however, in its turn requires a correspondingly large torque on the escapement wheel 13.

It can be immediately seen that with a given driving moment for the escapement wheel 13, the bearing pressure on the helical surfaces 8 and 9 is the greatest at a small speed of revolution of the measuring wheel shaft 3 and must necessarily decrease with increasing speed of rotation, inasmuch as in such case the required acceleration increases and the existing torque is decreased by a corresponding amount. Therefore, when the torque produced on the measuring wheel by the bearing pressure gives the desired additional drive for the compensation of the bearing friction on the measuring-wheel shaft at a low speed of rotation of the measuring-wheel shaft, it will no longer be sufficient for high speeds of rotation. The error, which becomes greater with increasing speed of rotation of the measuring-wheel shaft, must then be made up by the measuring wheel 4, inasmuch as otherwise the escapement wheel 13 would lag and the proportionality between the speed of rotation of the measuring-wheel shaft 3 and the counting mechanism indication at 18 would be lost.

In order to assure the carrying along of the escapement wheel in all positions which the escapement wheel and the helical surfaces 8 and 9 assume with respect to each other, the helical surfaces must cover (see Fig. 2) each other to a sufficient extent in the transition zone, or else pass into each other. In this latter case the escapement wheel meshes with a single continuing helical worm and there is obtained a further simplification, and instead of an intermittent rotary motion of the escapement wheel 13 there is obtained a continuous rotation, as in combination with Fig. 3 will be still further described and explained.

If, however, the drive itself produces higher speeds of rotation, there may advantageously be used a slip-clutch which gives the escapement wheel a torque of the desired (constant or variable) magnitude.

It may happen that the drive of the escapement wheel will stop for some reason or other, for example, due to a failure of current when using an electric motor or the running down of the spring in connection with a clock mechanism or the failure of pressure in the case of gas or compressed air drive, etc. In such a case, the sudden load which the previously unloaded measuring wheel will receive by now driving entire counting mechanism, will shift the curve of error determined by calibration, and thus make such calibration illusory, rendering the measurements inaccurate, as later will be still further explained in combination with Fig. 3a.

In order to counteract this danger and to prevent the fluid being measured from passing unmeasured through the meter in such cases, there is provided in accordance with the present invention a torque responsive device as an auxiliary device, which, upon failure of the driving force to the escapement wheel, either shuts off the admission of the fluid to be measured into the meter or connects some substitute means for the missing driving force. In the former case, the torque indicator constitutes the drive or the control of a shut-off device installed in the measurement line (a valve or the like); in the second case, it serves as switch for an auxiliary source of energy. Of course, both embodiments of the auxiliary device can be used simultaneously and the arrangement be such that first of all the auxiliary source of energy is connected and that only in case of its failure is the valve closed in the measuring line.

In all these cases it is immaterial whether the action torque of shaft 12 or the reaction torque of the escapement-wheel drive 15 is used.

One embodiment of the invention with such an auxiliary safety device is shown in Fig. 3.

The escapement wheel 13 is driven in this case by a spiral spring drive 15 which drives the escapement wheel shaft 12 through the crank shaft 19, a slip-clutch 20 and the gear mechanism 16, 17. The pins 14 of the wheel 13 engage in the helical surfaces 8 and 9 of the worm provided on the measuring wheel shaft 3. A drive for the counting mechanism 18 is branched off from the gear mechanism 16, 17. One end of the spiral spring 15 is fastened to shaft 21, to which there is fixed one sun gear 22 of a differential gearing 22, 23, 24. Sun gears 22 and 23 are only connected to each other through planetary gear 24. The other sun gear 23 is fixed to shaft 25 on which there is fixed a ratchet wheel 26 in which the pawl 27 engages and prevents rearward rotation. To the same shaft 25 there is also fixed an electric motor 29 and a key 28 for the manual winding up of the spiral spring 15, the arrangement being such that each of these two drives can be used independently of the other.

The planet gear 24 is rotatably mounted on a cross shaft, the extension of which to one side forms the lever arm 30, and to the other side the lever arm 31. Lever arm 30 is engaged by the return spring 32 which tends to pull it upward. The lever arm 31 is connected at 33 to the connecting rod 34 and the latter is connected at 35 to the stem 36 of valve 37, 38. This valve is in this case in the admission line 39 of the measuring-wheel meter. It can, of course, also be arranged at its outlet.

In order to transmit the driving moment to the escapement wheel 13, the spiral spring mechanism 15 is wound up, for instance, by means of key 28. The ratchet wheel 26 permits only of rotation in clockwise direction, this direction being reversed by the planet gear 24. The sun gear 22 therefore rotates in counterclockwise direction, as does shaft 21, so that the spiral spring 15 is tensioned.

The spring 15 tends reactively to swing the lever arm 30 downward against the action of spring 32. The more the spiral spring 15 is tensioned, the greater the effect of its reaction force on lever arm 30, and therefore also the more spring 32 is tensioned and thus stretched.

There therefore always exists a condition of equilibrium between the force action of springs 15 and 32. Only when the swinging of the double-armed lever 30, 31 has become so great that the valve plate 37 comes against stop 40, is spring 15 further tensioned upon continued winding, while spring 32 is not imparted any further tensioning. When the measuring mechanism has run down and the spiral spring 15 has become untensioned, spring 32 again enters into action, and the swinging back of the double-armed lever 30, 31 begins, so that, with decreasing tension of spring 15 or 32, the shut-off valve 37, 38 gradually closes, until, finally, at a given desired low limit of the spring force, it is completely closed. In this manner, as long as the medium to be measured flows through the measuring-wheel meter, the measuring mechanism will not be without any drive from the spring mechanism 15. Only after spring mechanism 15 has been wound up again, does valve 37, 38 open and the measurement begin again.

The torque produced by spring mechanism 15 on escapement wheel 13 is proportional to the spring tension. This is of no importance if the pitch of the helical surfaces 8, 9 has been so selected that only the frictional moment produced by the bearing pressure of pins 14 is abolished. If, however, in accordance with the present invention it is desired to impart to the measuring-wheel shaft 3 by means of the bearing pressure of pins 14, a small additional driving moment which is approximately constant, it must be seen to that the torque given by the spiral spring 15 is compensated, except for the desired residual amount, by a braking moment acting proportionally to the spring tension at 15.

For this purpose, in the embodiment according to Fig. 3a, there is to be provided, for instance, a double-armed lever 42, 43 supported in a swingable manner at 41, arm 42 of said lever resting against the part of slip-clutch 20 driven by spring mechanism 15, while arm 43 is loaded by an adjustable weight 44. The return spring 32 should in this case be suspended from arm 42 of the double-armed lever 42, 43 (instead of from a fixed point), so that its frictional pressure on clutch 20 and the braking moment produced thereby are now proportional to the torque of spiral spring 15. They can be so selected that they balance out this torque. The said counterweight 44 reduces the force of spring 32 by an amount of the desired magnitude, which is constant for all loads, so that the driving moment of spring mechanism 15 is not completely braked, but only braked to a partial amount corresponding to the value of weight 44, this partial amount being available to the escapement wheel 13. The slip-clutch 20 then acts as additional assurance for the avoiding of transmission of excessively large torques. The differential gear 22, 23, 24 with the double-armed lever 30, 31, represents a torque indicator of a type known per se, which, in accordance with the present invention, serves here to actuate the shut-off valve 37, 38 and for the torque regulation on clutch 20.

From Fig. 3 there can also be noted an illustrative arrangement using an electric winding device for the spring mechanism 15. The said electric motor 29 is placed in action as soon as the contact member 45 arranged on the end of lever arm 30 comes in touch, during its upward motion, with the contact spring 46 and closes the circuit. The circuit remains closed until lever arm 30 swings downward under the influence of the increasing tension of spring 15 and thus disengages contact member 45 from spring 46. Motor 29 then comes to a stop. Also in this case, there again exists the afore-described condition of equilibrium between the force effects of springs 15 and 32. While return spring 32 of the torque responsive device tries to close the circuit, the spring mechanism 15 or its moment of reaction endeavors to open it. It can be immediately seen that with this arrangement the spiral spring mechanism 15, due to the contact actuation which is dependent on the torque, gives an approximately constant torque which fully suffices to compensate for all resistances to rotation of the measuring wheel shaft 3 and of the drive transmission to the counting mechanism 18, and that the braking device 41—44 as shown in Fig. 3a can be dispensed with.

The present invention is not limited to the embodiments and steps described herein, but can be modified in various manners. So, for example, instead of the ordinary valve 37, 38, there can be provided a rapid closure valve so that the shutting-off of the admission of the medium to be measured into the meter takes place suddenly at a given moment.

As the intermittent motion device, there can also be used a pinion-leaf toothing of any known design in which connection the mating wheel engaging in the pinion-leaf forms the escapement wheel. Fig. 4 shows a diagrammatical representation of this embodiment. The pinion-leaf toothing is designated 47 and represented in the simplest form as a toothed wheel or pinion having two pin-shaped teeth 8 and 9 and cooperating with the pins 14 of the escapement wheel 13 in the same manner as described with the preceding figures. The pinion-leaf toothing gives said little additional drive to the measuring wheel shaft 3 according to the invention. The pins 8, 9 of the pinion-leaf toothing 47 correspond to the parts 8, 9 of the other figures.

The counting mechanism, such as is designated 18 in the drawings, may be of any known or conventional construction. These counting mechanisms and their structure are, of course, well known in the art, and a detailed description thereof is not necessary. Means connecting the independent drive means, such as the motor 15, to the counting mechanism may be any known or conventional transmission means. The term "transmission means" is specifically intended to include the drive shaft of the drive means, such as the drive shaft 12 and any intermediate gearing or shafts, such as the gearing train 17.

I claim:

1. A measuring-wheel meter for volume-indicating measurement of flowing fluids, comprising a rotatably mounted measuring wheel responsive to fluid flow, a counting mechanism, independent drive means for said counting mechanism, transmission means connected to said drive means and positioned for driving actuation of said counting mechanism, an escapement wheel having spaced-apart projecting pins arranged about its periphery connected to said transmission means, a control mechanism cooperating with said escapement wheel mounted on a shaft for rotation with said measuring wheel for releasing said escapement wheel for rotation at a speed proportional to the rotation of said measuring wheel, said control mechanism defining a helical surface connected for rotation with said measuring wheel and positioned for engagement contact with said projecting pins of said escapement wheel, said helical surface being defined by a pair of spaced-apart helical circular discs, mounted on said shaft for rotation with said measuring wheel, each of said discs defining at least one recess for the passage of said projecting pins of said escapement wheel therethrough, the recess of one of said discs being staggered in relation to the recess of the other said disc, said helical surface having an angle of slope greater than the angle of friction between the escapement wheel projecting pins and said surface, whereby contact between said projecting pins and said helical surface transmits an additional drive torque to said measuring wheel.

2. Measuring-wheel meter according to claim 1 which includes torque responsive means connected to said transmission means and to said drive means, said torque responsive means having a member movable in response to the torque transmitted between said drive means and said escapement wheel, and a safety mechanism actuated by said last-named member for interrupting measuring actuation of said measuring wheel upon failure of said drive means to transmit said torque to said escapement wheel.

3. Measuring-wheel meter according to claim 2, in which said safety mechanism includes a shut-off valve positioned in the measuring line for actuation by said torque responsive means.

4. Measuring-wheel meter according to claim 1 including torque responsive means connected to said transmission means and to said drive means, said torque responsive means having a member movable in response to the torque transmitted between said drive means and said escapement wheel and a braking device actuated by said last-named member positioned for braking contact with said transmission means upon failure of said drive means to transmit said torque to said escapement wheel.

5. Measuring-wheel meter according to claim 1, including a torque-responsive means connected to said drive means and to said transmission means and auxiliary drive means positioned for driving actuation of said transmission means upon actuation by said torque-responsive means.

6. Measuring-wheel meter according to claim 1, in which said drive means includes a spring-drive mechanism connected on one side to said transmission means and including a ratchet wheel, a differential drive, and a shut-off valve positioned in the measuring line, said ratchet wheel being positioned on the other side of said spring mechanism and being connected thereto through said differential drive, said differential drive being connected for actuation of said shut-off valve.

7. Measuring-wheel meter according to claim 1, in which said drive means includes a spring motor, a friction clutch, and means for winding said spring motor, said spring motor being connected to said transmission means through said friction clutch.

8. Measuring-wheel meter according to claim 7, in which said means for winding said spring motor is an auxiliary drive means and including a torque-responsive means connected to said drive means and to said transmission means for actuating said auxiliary drive means.

9. Measuring-wheel meter according to claim 1, including a friction clutch connecting said drive means to said transmission means.

References Cited in the file of this patent

UNITED STATES PATENTS

| | | |
|---|---|---|
| 626,518 | Bassett | June 6, 1899 |
| 1,922,071 | Bassett | Aug. 15, 1933 |
| 2,109,178 | Marden | Feb. 22, 1938 |
| 2,109,352 | Hazard | Feb. 22, 1938 |
| 2,342,997 | Bassett | Feb. 29, 1944 |